United States Patent
Hong et al.

(10) Patent No.: US 9,326,320 B2
(45) Date of Patent: Apr. 26, 2016

(54) SYSTEMS AND METHODS FOR ANTENNA SWITCHES IN AN ELECTRONIC DEVICE

(71) Applicant: Google Technology Holdings LLC, Mountain View, CA (US)

(72) Inventors: Soo Won Hong, Vernon Hills, IL (US); Ik Hee Park, Round Lake, IL (US); Benjamin O White, Crystal Lake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/012,050

(22) Filed: Aug. 28, 2013

(65) Prior Publication Data

US 2015/0017978 A1    Jan. 15, 2015

Related U.S. Application Data

(60) Provisional application No. 61/844,933, filed on Jul. 11, 2013.

(51) Int. Cl.
*H04W 4/00* (2009.01)
*H04W 88/06* (2009.01)
(Continued)

(52) U.S. Cl.
CPC ............... *H04W 88/06* (2013.01); *H04B 1/006* (2013.01); *H04B 1/0458* (2013.01); *H04B 1/18* (2013.01); *H04B 1/48* (2013.01); *H04B 1/525* (2013.01)

(58) Field of Classification Search
CPC ..... H04W 88/06; H04W 92/02; H04W 88/02; H04W 68/00; H04W 76/02; H04W 74/08; H04B 1/006; H04B 1/0458; H04B 1/18; H04B 1/48; H04B 1/525

USPC ............... 455/130, 552, 78, 82, 83, 103, 132, 455/133, 562.1, 431, 91, 426.1; 343/702; 375/40.26
See application file for complete search history.

(56) References Cited

U.S. PATENT DOCUMENTS 5,634,200 A * 5/1997 Kitakubo et al. ............... 455/82
6,560,444 B1    5/2003 Imberg
(Continued)

FOREIGN PATENT DOCUMENTS

DE        10053205 A1     5/2002
EP         1158686 A1    11/2001
SE    WO 0111721 A1 *    2/2001 ............... H01Q 1/36

OTHER PUBLICATIONS

Renesas, "uPG2417T6M GaAs Integrated Circuit SP6T Switch for NFC Application" (R09DS0010EJ0100) Rev.1.00 data sheet, Dec. 24, 2010, 13 pages.
(Continued)

*Primary Examiner* — Mahendra Patel
(74) *Attorney, Agent, or Firm* — Wolfe-SBMC

(57) ABSTRACT

Systems and methods are provided for an antenna switch module (300) for an electronic device (302) including wireless communication circuitry (308) and an antenna (304) configured to transmit and receive signals over a plurality of frequency bands. The antenna switch module may include a plurality of antenna switches (310, 312) positioned in series and configured to pass signals between the antenna and wireless communication circuitry and to selectively operate in one of the bands. The first antenna switch (310) may include a plurality of pins (314) arranged in a first configuration, and the second antenna switch (312) may include a plurality of pins (316) arranged in a second configuration that is a mirror image of the first configuration. The antenna switch module may further include a plurality of non-overlapping signal paths (318) configured to selectively deliver signals between the antenna switches, each signal path being associated with a respective band.

20 Claims, 5 Drawing Sheets

(51) Int. Cl.
*H04B 1/00* (2006.01)
*H04B 1/04* (2006.01)
*H04B 1/18* (2006.01)
*H04B 1/48* (2006.01)
*H04B 1/525* (2015.01)

(56) References Cited

U.S. PATENT DOCUMENTS

| | | | |
|---|---|---|---|
| 6,879,942 B1 * | 4/2005 | Nagase et al. | 703/2 |
| 7,142,884 B2 | 11/2006 | Hagn | |
| 7,835,711 B2 * | 11/2010 | McFarland | 455/130 |
| 7,936,237 B2 | 5/2011 | Park et al. | |
| 2002/0037742 A1 * | 3/2002 | Enderlein | H04B 1/005 455/552.1 |
| 2002/0090974 A1 * | 7/2002 | Hagn | H04B 1/005 455/552.1 |
| 2004/0178912 A1 * | 9/2004 | Smith | G06K 7/0008 340/572.7 |
| 2007/0238425 A1 | 10/2007 | McFarland | |
| 2010/0109796 A1 * | 5/2010 | Park | H01P 1/213 333/103 |
| 2011/0116423 A1 * | 5/2011 | Rousu | H01Q 1/242 370/297 |
| 2013/0194154 A1 * | 8/2013 | Puente Baliarda et al. | 343/860 |
| 2013/0307735 A1 * | 11/2013 | Contreras et al. | 343/702 |

OTHER PUBLICATIONS

European Patent Office, International Search Report and the Written Opinion in International Patent Application PCT/US2014/045956 (Oct. 31, 2014).

Guo,"A Series-Shunt Symmetric Switch Makes Transmit-Receive Antennas Reconfigurable in Multipath Channels", IEEE 3d Int'l Conf. on Digital Object Identifier, May 29, 2011, pp. 468-71.

MACCM"GaAs SP6T 2.5V High Power Switch Dual-/Tri-/Quad-Band GSM Applications", Rev. V1 data sheet, www.macomtech. com, Mar. 22, 2003, 5 pages.

Valkonen,"Impedance Matching and Tuning of Non-Resonant Mobile Terminal Antennas", Aalto University Doctoral Dissertations, Mar. 15, 2013, 94 pages.

* cited by examiner

SYSTEMS AND METHODS FOR ANTENNA SWITCHES IN AN ELECTRONIC DEVICE

FIELD

This application generally relates to wireless communication devices. In particular, the application relates to platforms and techniques for providing antenna switches in wireless communications devices.

BACKGROUND

Modern wireless communication devices, including mobile telephones and other portable radio communication devices, offer an expanded set of features that are increasingly dependent on bandwidth and require complex circuitry for performing the multitude of functions that enable those features. One such feature is the flexibility to operate under multiple communications standards and/or across multiple bands of operation to enable interoperability between existing and emerging radio access technologies (RATs) and/or to accommodate international business and recreational travelers. Another feature is the ability to provide high speed, high data rate wireless communications in order to satisfy the growing demand for connectivity in an increasingly mobile world.

To provide at least these features, mobile communications devices now have an increasing number of antennas, covering multiple frequency bands and both cellular RATs and non-cellular RATs. The cellular RATs may include, for example, GSM (Global System for Mobile Communications), EDGE (Enhanced Data Rates for GSM Evolution), UMTS (Universal Mobile Telecommunications System), and LTE (Long Term Evolution). Note that each of these RATs can be considered evolutions of the same platform and are colloquially referred to as 2G, 2.5G, 3G, and 4G technologies, respectively. CDMA (Code Division Multiple Access) is another cellular RAT and can be considered a competing 3G technology that blends into LTE's 4G technology. The non-cellular RATs may include, for example, Bluetooth®, Near Field Communication (NFC), Wireless Local Area Network (WLAN, a.k.a. WiFi), Wireless Metropolitan Area Networks (WMAN, a.k.a. WiMax), Radio Frequency Identification (RFID), Global Positioning System (GPS), etc. The increasing number of antennas has created an increasing number of antenna design challenges related to isolation, efficiency, bandwidth, impedance matching, insertion loss, and other related factors.

Further, since each RAT may support one or more frequency bands, and each frequency band of a given RAT may be assigned to specific regions of the world and/or specific wireless communication carriers, global mobile device manufacturers often create multiple carrier, region, and/or RAT-specific versions or variants of their mobile devices in order to have a presence in various markets around the world. Each of these variants may include antennas and accompanying wireless communication circuitry (e.g., switches, power amplifiers, filters, duplexers, signal paths, transceivers, etc.) that are specifically tuned or optimized for the particular RAT(s) and/or frequency bands supported by the variant, thus increasing costs and manufacturing complexity.

Competing with the increasing demands on the radio portion of the mobile device is the constant push to minimize the size, weight, power consumption, and cost of mobile devices. A couple ways to minimize these characteristics include reducing the number of components and/or connections within the device and performing multiple functions using the same components. To that extent, some commercially-available mobile devices include one or more multi-band antennas that are capable of selectively operating in one of a plurality of frequency bands at a time. Such multi-band antennas can reduce the overall antenna size and/or can widen the total range of frequencies that are covered by the antenna. Multi-band antennas also add to the design complexity of the radio portion. For example, each multi-band antenna typically requires antenna matching circuitry, or an antenna switch module, as an interface between the antenna and the wireless communication circuitry in order to provide appropriate impedance matching over each frequency of operation.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1:
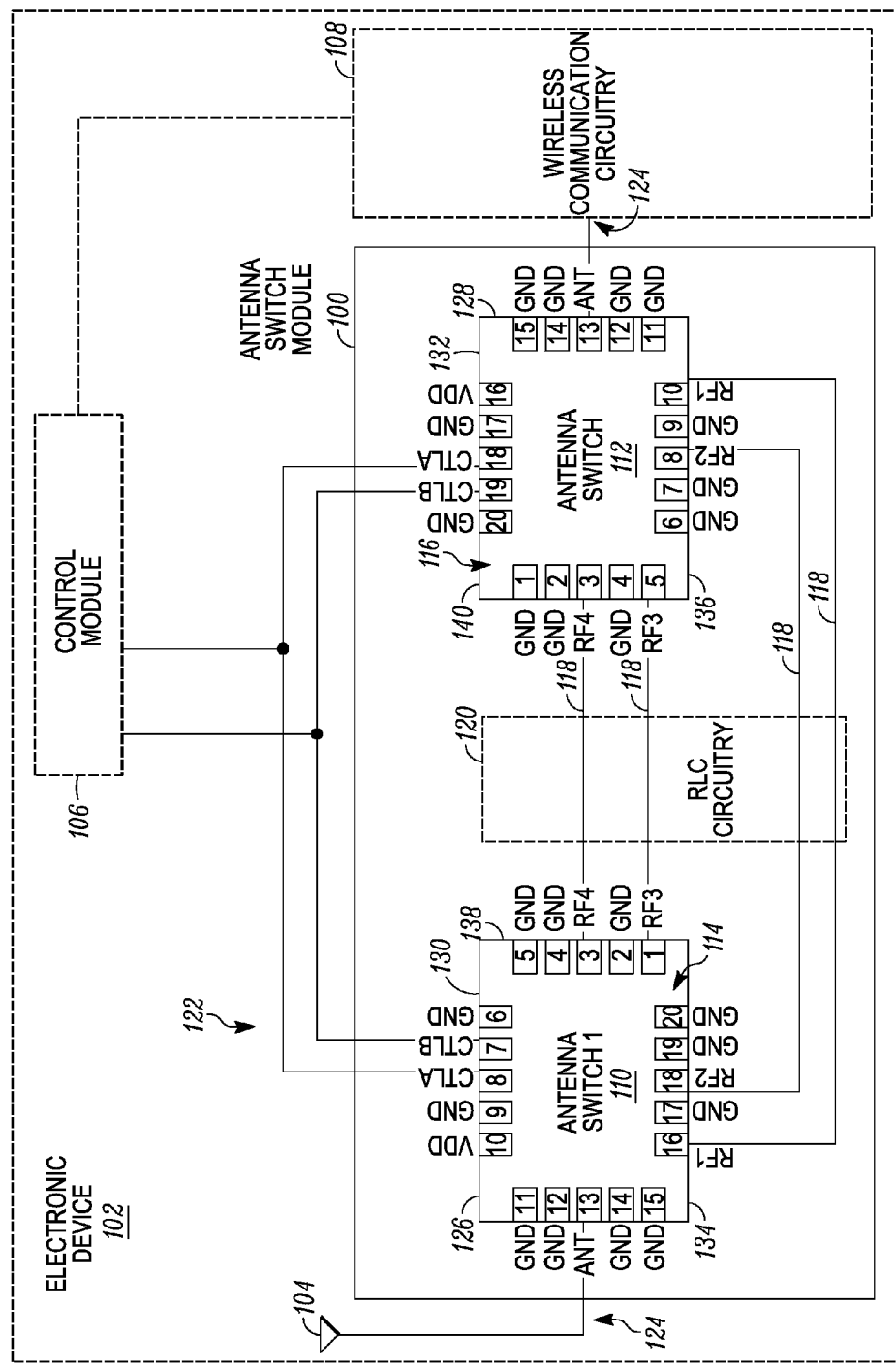
FIG. 1 illustrates an example antenna switch module in accordance with some embodiments.

Systems and methods disclosed herein provide an antenna switch module configured to support an antenna structure that is capable of transmitting and/or receiving signals over a plurality of frequency bands (or sub-bands). According to one aspect, the antenna switch module may be tuned or optimized to pass signals within the plurality of frequency bands, and the antenna structure may be configured to operate in at least one of the plurality of frequency bands at a given time. The antenna switch module may include a first antenna switch positioned in series with a second antenna switch and a plurality of nonoverlapping signal paths configured to selectively deliver signals between the two switches. The signal path selected to deliver a given signal may depend on the frequency band of the signal, as each signal path may be configured for operation in a particular frequency band. For example, each of the signal paths may be coupled to circuitry components that are fine-tuned to provide impedance matching over the frequency band associated with the signal path. Moreover, to provide nonoverlapping signal paths, the first antenna switch may include a plurality of pins arranged in a first configuration, the second antenna switch may include a plurality of pins arranged in a second configuration that is a mirror image of the first configuration, and each signal path may be coupled to corresponding (e.g., mirrored) pins at the two switches. As such, the antenna switch module provided herein may provide improved isolation and better impedance matching for each band of antenna operation, thereby enhancing overall antenna performance.

According to one aspect, the plurality of frequency bands covered by a given antenna structure may be supported by one or more wireless communication standards. As used herein, the term "wireless communication standards" includes any type of radio access technology (RAT), including wireless wide area networks (e.g., GSM, EDGE, CDMA, WCDMA (Wideband Code Division Multiple Access), TD-SCDMA (Time Division Synchronous CDMA), HSPA (High Speed Packet Access), UMTS, LTE, GPS, etc.), wireless local area networks (e.g., WiMAX or WiFi, etc.), personal area networks (e.g., Bluetooth, NFC, RFID, ZigBee, UWB (Ultra Wide Band), etc.). The range of frequencies covered by each RAT system varies widely, can be specific to a country or region, and in some cases, overlaps across systems.

For example, the GSM digital system currently operates in frequencies between 850 megahertz (MHz) and 1900 MHz. More specifically, the GSM system covers a frequency band around 850 MHz that is known as GSM850 or GSM800 and can include, e.g., 824-849 MHz on the uplink (UL) and 869-894 on the downlink (DL). The GSM system also covers a frequency band around 900 MHz that is known as GSM900 and can include, e.g., 890-915 MHz UL and 935-960 MHz DL. Additionally, the GSM system covers a frequency band around 1800 MHz that is known as GSM1800 and can include, e.g., 1710-1785 MHz UL and 1805-1880 MHz DL. Further, the GSM system covers a frequency band around 1900 MHz that is known as GSM1900 and can include, e.g., 1850-1910 MHz UL and 1930-1990 MHz DL. GSM900 and GSM1800 are used in most parts of the world, including Europe, Middle East, Africa, Australia, Oceania, and most of Asia. Different countries within South and Central America use different combinations of the GSM bands. GSM 850 and GSM 1900 are used in Canada and the United States. The GSM system includes other, less commonly used frequency bands that are not listed herein for the sake of brevity. EDGE adds a packet-data infrastructure to GSM and is fully backwards-compatible with the older GSM network. Thus, EDGE can operate within the existing GSM frequency bands.

UMTS utilizes the same core network as GSM but employs WCDMA technology. In general, the UMTS system operates in frequencies between 700 MHz and 2100 MHz. The specific frequency bands allocated to UMTS are divided into numbered operating bands, which are assigned to specific regions of the world. Four of these operating bands, commonly known as WCDMA850 (Band 5), WCDMA900 (Band 8), DCS1800 (Band 3), and WCDMA1900 (Band 2), at least generally overlap with the GSM850, GSM900, GSM1800, and GSM1900 frequency bands, respectively. Operating band 4, commonly known as WCDMA1700 or AWS (Advanced Wireless Services), includes frequencies around 1700 MHz on the uplink (UL) (e.g., 1710-1755 MHz UL) and 2100 MHz on the downlink (DL) (e.g., 2110-2155 MHz). Operating band 1, commonly known as WCDMA2100, includes frequencies around 2100 MHz (e.g., 1920-1980 MHz UL and 2110-2170 MHz DL). Operating band 7, commonly known as IMT-E, includes frequencies around 2600 MHz (e.g., 2500-2570 MHz UL and 2620-2690 MHz DL). Operating bands 12, 13, and 17, commonly known as SMH, include frequencies around 700 MHz (e.g., 698-716 MHz UL and 728-746 MHz DL, 777-787 MHz UL and 746-756 MHz DL, and 788-798 MHz UL and 758-768 MHz DL, respectively). Operating band 11 includes frequencies around 1500 MHz (e.g., 1428-1448 MHz UL and 1476-1496 MHz DL). Operating bands 19 and 20 include frequencies around 800 MHz (e.g., 832-842 MHz UL and 877-887 MHz DL, and 832-862 MHz UL and 791-821 MHz DL, respectively). UMTS covers additional operating bands that are not listed here for the sake of brevity.

The TD-SCDMA system is part of the UMTS network, particularly in China, and is an alternative to WCDMA. TD-SCDMA is also known as UMTSA-TDD or IMT 2000 Time-Division (IMT-TD). The TD-SCDMA network in China currently operates in frequency bands at or around 1900 MHz or Band 39 (e.g., 1880 MHz to 1920 MHz) and 2000 MHz or Band 34 (e.g., 2010 MHz to 2025 MHz). Other regions of the world utilize other TD-SCDMA bands that are not listed here for the sake of brevity.

LTE is designed to coexist with the UMTS and GSM systems and therefore, supports both future and legacy (existing) frequency bands, including the operating bands listed above for the GSM and UMTS systems. Accordingly, the LTE system currently operates in frequencies between 700 MHz and 2600 MHz. More specifically, the frequency bands covered by LTE in different regions of the world include: 700 MHz or Bands 12, 13, or 17, used in the United States and Canada; 800 MHz or Band 20, used in Europe; 850 MHz or Band 5, used in the Americas, parts of Asia, and Australia; 900 MHz or Band 8, used in parts of South America and Asia and in South Africa; AWS or Band 4, used in the United States, Canada, and Chile; 1800 MHz or Band 3, used in Europe, Asia, and Oceania; 1900 MHz or Band 2, used in North America and parts of South America; 2100 MHz or Band 1, used in Brazil, Europe, Asia, Africa, and Oceania; 2500 MHz or Band 41, used in South America; and 2600 MHz or Bands 7 or 38, used (or projected for use) in North America and parts of South America, Asia, and Europe.

The CDMA system currently operates in frequency bands between 850 MHz and 2100 MHz. More specifically, the frequency bands covered by CDMA in different regions of the world include: bands BC0 and BC10, both of which cover frequencies at or around 850 MHz; band BC1, which covers frequencies at or around 1900 MHz band; and BC15, which covers frequencies at or around 1700 MHz UL and 2100 MHz DL. Further, the CDMA system currently provides coverage throughout North America and in Brazil, China, India, and South Korea, as well as other regions of the world.

In addition, WiFi and Bluetooth both operate in the ISM (industrial, scientific, and medical) radio band that appears at or around 2400 MHz (more specifically, at 2450 MHz), and GPS operates at or around the 1575 MHz band.

Electronic device manufacturers are consistently looking for ways to lower the production and design costs of their electronic devices, and thereby increase profit margins, without losing the complexity and flexibility that users expect from today's devices. For example, given the broad range of frequency bands covered by each of the different RATs, as discussed above, it can be very challenging, and expensive, to design a single electronic device with an antenna system that can support each of the various frequency bands and can enable the demanding functionality that users have come to expect from, for example, wireless or mobile communication devices. However, it can also be very challenging, and expensive, to design individual variants of a given electronic device that specifically support a select combination of frequency bands, RATs, regions, and/or wireless carriers, especially if a layout of the electronic components (e.g., printed circuit board, battery, camera, speaker, etc.) within each variant differs in an attempt to achieve optimal antenna performance for the variants.

According to some aspects, one technique for improving the profitability of device manufacturing, as well as the antenna performance of multiple device variants, may include creating commonality in the layout and/or composition of internal components across all or most variants of a given electronic device. Such commonality in the shape and layout of internal components may translate to commonality in, for example, the antenna structures provided for each variant, and/or the antenna switch module that accompanies certain antenna structures. Accordingly, in one embodiment, a common antenna switch module may be implemented in multiple variants of an electronic device by maintaining commonality in the configuration of the antenna switches included in the antenna switch module, the pins included in each switch of the module, and the signal paths connected between the pins of the switches, across each variant of the electronic device. Moreover, the common antenna switch module may be configured to provide improved antenna performance across multiple frequency bands by including, for example, two antenna switches and non-crossing signal paths between the switches to increase isolation, and finely-tuned matching circuitry on each signal path to reduce insertion loss and improve antenna efficiency.

FIG. 1 depicts an example antenna switch module 100 consistent with some embodiments. The antenna switch module 100 may be included in an electronic device 102 that includes one or more wireless communication components, such as antenna 104. As can be seen in FIG. 1, the antenna switch module 100 may be coupled to the antenna 104 at one or more connection points, as will be discussed in more detail below. The antenna 104 may include any suitable type of antenna structure, such as, e.g., an inverted L-antenna, dual inverted L-antenna, inverted-F antenna, or hybrids of these antenna structures.

It should be appreciated that the antenna switch module 100 and/or the electronic device 102, as depicted, are merely an example and can include various combinations of hardware and/or software components. According to some embodiments, the electronic device 102 may be a mobile computing device, such as, for example, a smartphone or any other type of mobile communications device, a tablet, an e-reader, a portable gaming device, a portable media player, a personal digital assistant, a laptop computer, a desktop computer, or any other mobile or electronic device that includes one or more wireless communication components. In FIG. 1, the electronic device 100 is depicted as a mobile device.

According to some aspects, the electronic device 102 may be associated with a "family" of mobile devices, wherein each member of the family is a variant of the other mobile devices. This family of variants may have certain common features, such as, a common antenna arrangement, a common printed circuit board (including commonality in the layout of conductive traces), a common layout of one or more other components within the electronic device 100, and/or common antenna banding (e.g., the frequencies to which individual antennas are tuned) in each variant. In some embodiments, each variant may have one or more differentiating features that set the variant apart from the rest of the family. For example, each variant may be configured to provide coverage for a specific combination of frequency bands, RATs, regions of the world, and/or wireless communications carriers.

According to one aspect, a printed circuit board of each variant may include a substantially similar layout of conductive traces, but may differ in terms of the electronic components that are coupled to the traces, as the electronic components may be specific or unique to the RAT supported by that variant. For example, a variant that supports the GSM system may include a GSM-specific integrated circuit, and a variant that supports the CDMA system may include a CDMA-specific integrated circuit. Since the conductive traces of the printed circuit board may be the same across variants, the GSM-specific integrated chip may be mounted to the printed circuit board of the GSM variant in substantially the same position (e.g., connected to substantially the same conductive traces at substantially the same locations), as the CDMA-specific integrated chip in the printed circuit board of the CDMA variant, thus creating commonality in the arrangement of the printed circuit boards of the different variants.

To give an example of a family of variants, in one embodiment, a first variant may be configured to operate within the UMTS and GSM systems (e.g., UMTS bands B1, B2, B5, and B8 and all four GSM bands or quad-band GSM), a second variant may be configured to operate within the GSM and CDMA systems (e.g., quad-band GSM and CDMA bands BC0, BC1, BC10, and BC15), a third variant may be configured to operate within the GSM system and the TD-SCDMA system in China (e.g., quad-band GSM and TD-SCDMA bands B34 and B39), a fourth variant may be configured to operate within the CDMA system (e.g., CDMA bands BC0, BC1, BC10, and BC15), and a fifth variant may be configured to operate within the CDMA and UMTS systems (e.g., UMTS bands B2, B4, and B5 and quad-band GSM). In one embodiment, there may be a sixth variant that is configured to operate within the LTE system (e.g., three or more of LTE bands 1, 2, 3, 4, 5, 7, 8, 12, 13, 17, 20, 25, 38, or 41). In addition to the RATs listed above, each of the variants may also support other RATs, such as, e.g., GPS, WiFi, Bluetooth, NFC, etc. Other combinations of RATs, frequency bands, regions, and/or carriers may be provided in accordance with the principles disclosed herein. The present disclosure is not limited to these specific combinations.

In some embodiments, each variant of a family may include a plurality of antennas (such as three or four antennas similar to antenna 104). Each of the antennas, and any antenna switch modules (such as antenna switch module 100) associated with the antennas, may be tuned to operate within a specified range of frequencies across all variants. For example, the antennas may be configured to support various types of wireless communications (or RATs), including non-cellular network communications (e.g., GPS, NFC, Bluetooth, WiFi, etc.) and voice and data cellular telephone communications (e.g., GSM, CDMA, UMTS, LTE, etc.). To this end, the antennas may be tuned to one or more of the frequency bands that are associated with the RATs supported by the electronic device 102. According to one aspect, the antennas need not be tuned to cover an RAT's entire banding, but only the frequency bands that are specifically being utilized by the device 102.

In one exemplary embodiment, each variant may include a main antenna structure that is configured to transmit and receive signals over the 850 MHz, 900 MHz, 1800 MHz, and 1900 MHz frequency bands (e.g., in accordance with GSM, UMTS, and/or LTE systems). Each variant may also include a second antenna structure that is configured to receive signals within frequency bands from 700 MHz to 2100 MHz (e.g., in accordance with CDMA and/or LTE systems). In addition, each variant may include a third antenna structure that is configured to receive signals over the 1575 MHz frequency band (e.g., in accordance with the GPS system). In one embodiment, each variant may also include a fourth antenna structure that is configured to transmit and/or receive signals within frequency bands of 2100 MHz or greater (e.g., in accordance with the Bluetooth, WiFi and/or LTE systems).

Referring back to FIG. 1, the electronic device 102 may represent a specific variant, such as one of the variants described above, and the antenna 104 may represent a specific antenna of that variant, such as one of the antennas described above. As such, according to one aspect, the antenna 104 may be configured to transmit and/or receive voice and/or data signals over a predetermined plurality of frequency bands (also referred to herein as "operating bands"). In one embodiment, the antenna 104 may be configured to operate in at least one of the frequency bands at a time, thus allowing the antenna 104 to be small in size, but broad in function. For example, the antenna 104 may be the second antenna of the electronic device 102 (e.g., not the main antenna described above).

In one exemplary embodiment, the plurality of frequency bands supported by the antenna 104 may include LTE high bands B1 (e.g., 2100 MHz), B2 (e.g., 1900 MHz), and B3 (e.g., 1800 MHz) and/or carrier-specific LTE bands B12 (e.g., 700 MHz, for US Cellular networks), B13 (e.g., 700 MHz, for Verizon networks), B17 (e.g., 700 MHz, for AT&T networks), and/or B20 (e.g., 800 MHz, for Verizon Networks). In such an embodiment, the antenna 104 may be selectively configured to operate in any one or combination of these frequency bands depending on, for example, the carrier to which the user has subscribed, the spectrum availability of the region in which the user is currently located, and/or the signal strength in each of the operating bands.

In other embodiments, the antenna 104 may be configured to support voice and data cellular telephone communications over one or more other cellular network communications or RATs, such as, e.g., GSM, UMTS, CDMA, etc., and/or various types of non-cellular network communications (e.g., GPS, NFC, Bluetooth, WiFi, etc.). In some embodiments, the exact operating bands associated with the antenna 104 may vary depending on the carrier(s) for which the electronic device 100 is being manufactured, the region(s) for which the electronic device 102 is being manufactured, the RATs that will be supported by the electronic device 102, a specific model number or type of the electronic device 102, and/or any other factor that affects how the antenna 104 and antenna switch module 100 are configured.

As shown in FIG. 1, the electronic device 102 may further include a control module 106 that is coupled to the antenna switch module 100 at one or more connection points, as will be discussed in more detail below. The control module 106 may be any type of integrated circuit capable of generating and/or providing one or more control signal(s) to the antenna switch module 100. The control signal may control the frequency band operation of the module 100. For example, in one embodiment, the control signal includes an instruction to the antenna switch module 100 to operate in a specific frequency band. According to some embodiments, the control module 106 may include, or be included within, a processer (such as, e.g., a digital signal processor, a microcontroller, a microprocessor, etc.), a modem, a modulator, a demodulator, and/or a power management unit. The one or more control signal(s) provided by the control module 106 to the antenna switch module 100 may be a control logic signal (e.g., "0", "1", low, high, etc.), an MIPI (Mobile Industry Processor Interface) control signal (e.g., including a clock signal and a data signal), or any other type of control signal.

Also as shown in FIG. 1, the electronic device 102 may further include wireless communication circuitry 108 that is coupled to the antenna switch module 100 at one or more connection points, as will be discussed in more detail below. The wireless communication circuitry 108 may include, for example, a plurality of amplifiers, power inverters, filters, switches, matching networks (e.g., including one or more resisters, inductors, and/or capacitors), and other components typically found in the radio frequency (RF) front-end architecture of a mobile communications device. In some embodiments, the wireless communication circuitry 108, the control module 106, and/or a processor of the electronic device 102 may determine which frequency band of operation to use for transmitting and/or receiving signals based on, for example, information received by the antenna 104 from one or more wireless communication system(s) (e.g., base station and/or access point infrastructure) regarding spectral availability, region-specific information, signal strength, etc. In one embodiment, the wireless communication circuitry 108 may make this determination and provide the frequency information to the control module 106, and the control module 106 may formulate the control signal based thereon.

Still referring to FIG. 1, the antenna switch module 100 may include a plurality of antenna switches, such as a first antenna switch 110 and a second antenna switch 112. The antenna switches 110 and 112 may include any type of switch technology that can be used in a mobile communication device, including for example, field-effect transistor (FET) switches, such as Gallium Arsenide (GaAs) and CMOS; mechanical switches, such as subminiature relays and micro-electromechanical (MEMS); and PIN diodes. In one embodiment, the antenna switches 110 and 112 may be commercially available integrated circuit switches that are designed for radio frequency applications (e.g., manufactured by RENESAS, MACOM, etc.). According to one aspect, the presence of two antenna switches 110 and 112 in the antenna switch module 100 may provide improved isolation for each band of antenna operation, thereby improving antenna performance.

According to one aspect, the antenna switches 110 and 112 may be configured to pass signals between the antenna 104 and the wireless communication circuitry 108. In one embodiment, the antenna switches 110 and 112 may be positioned in series with each other, or along the same general signal path (e.g., not in parallel). For example, a signal received by one of the antenna switches 110 or 112 may successively flow through to the other antenna switch 112 or 110. As such, a signal received by the antenna 104 may be passed from the antenna switch 110 to the antenna switch 112 and ultimately, to the wireless communication circuitry 108, and a signal received from the wireless communication circuitry 108 may be passed to the antenna switch 112, then to the antenna switch 110, and ultimately, to the antenna 104 for wireless transmission of the signal.

Each of the antenna switches 110 and 112 may include a plurality of pins (also referred to as pinouts, ports, or terminals), such as a first plurality of pins 114 and a second plurality of pins 116. According to one aspect, each of the plurality of pins 114 and 116 may include at least one control pin (e.g., CTLA, CTLB) configured to receive the control signal(s) from the control module 106, at least one ground pin (e.g., GND) configured to ground the switch, at least one voltage pin (e.g., VDD) configured to receive power from a power module, at least one input/output pin (ANT or I/O) configured to pass signals to or from the switch, and/or a plurality of signal pins (e.g., RF1, RF2, RF3, RF4) configured to be selectively coupled to the input/output pin in response to the control signal. The exact numbers and types of pins included in each of the antenna switches 110 and 112 may depend on a variety of factors, as described below.

Figure 2:
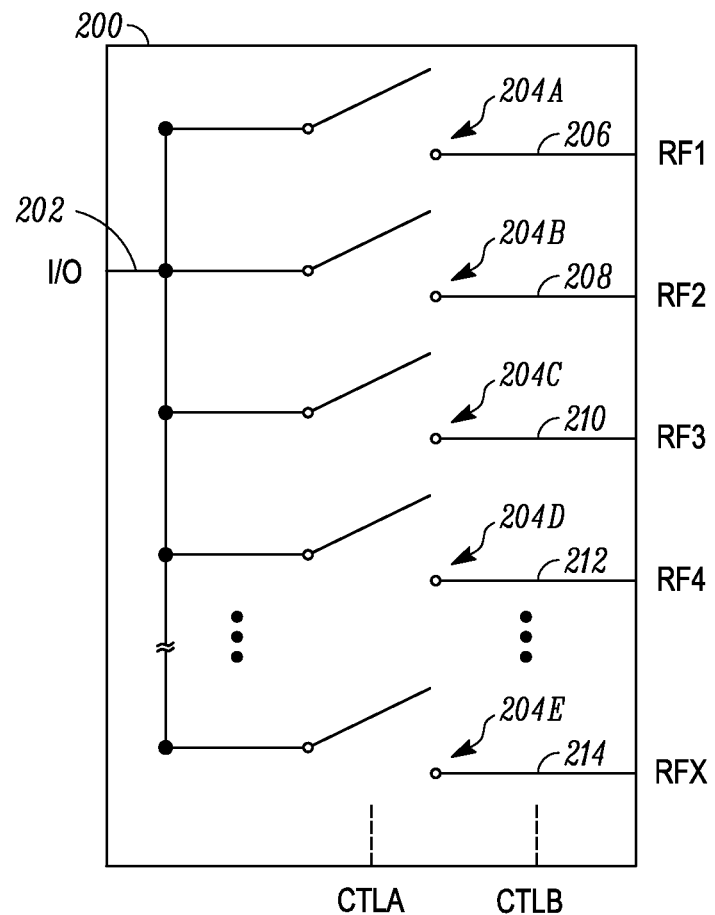
FIG. 2 illustrates a commercially available antenna switch.

For example, FIG. 2 illustrates a conventional antenna switch 200 schematic shown for the purpose of explanation. The switch 200 may be an SPxT ("Single Pole X Throws") switch because it includes a single input connection or "pole" 202 that is coupled to an "x" number of output connections or "throws," where "x" is a positive integer. The switch 200 also includes an "x" number of internal switches coupled between the "x" number of throws and the single pole 202. For example, in FIG. 2, each of a plurality of internal switch 204a, 204b, 204c, 204d, and 204e is coupled to a respective one of a plurality of throws 206, 208, 210, 212, and 214. As illustrated, the pole 202 may correspond to an input/output (I/O)

pin of the switch 200, while the throws 206, 208, 210, 212, and 214 may correspond to signal pins RF1, RF2, RF3, RF4, and RFX, respectively.

The internal switches 204a, 204b, 204c, 204d, and 204e are selectively coupled to respective throws 206, 208, 210, 212, and 214 depending on a set of control signals received at control pins 216 (e.g., CTLA and CTLB). As such, the control signals control which of the internal switches 204a, 204b, 204c, 204d, and 204e connects the pole 202 to one of the throws 206, 208, 210, 212, and 214 in order to form a signal path between the I/O pin and one of the signal pins. For example, if the control signals indicate that a signal should pass from the I/O pin to signal pin RF1 206, the switch 200 causes the internal switch 204a to "close," or connect to the throw 206, thereby creating a signal path from pole 202 to throw 206. If all of the internal switches 204a, 204b, 204c, 204d, and 204e are "open," or not connected to the throws, no signal path is formed and thus, no signal will pass through the switch 200. In the above manner, in response to control signal(s) received at the control pin(s) of a given antenna switch, the input/output pin of the antenna switch may be coupled to a specific signal pin within the switch, the signal pin being selected based on the frequency band specified by the control signal.

Referring back to FIG. 1, the exact number of throws, and signal pins coupled thereto, in a given antenna switch may be related to the number of different operating bands supported by the antenna 104. In one embodiment, each operating band may be assigned to or associated with a specific signal pin in each of the antenna switches 110 and 112, and each signal pin may be configured to pass or deliver only those signals that are within the associated operating band(s). According to one aspect, each of the signal pins may be configured for optimal performance with respect to the associated operating band(s) by being coupled to matching networks and/or other electronic components within the antenna switch that are specifically tuned to or optimized for the frequencies of the operating band(s).

In some embodiments, the value of "x" for each of the SPxT antenna switches 110 and 112 may be at least equal to a number of possible operating states of the antenna 104, wherein each operating state relates to a group of frequencies or bands in which the antenna 104 may operate at one time. According to one exemplary embodiment, the antenna 104 can have four possible operating states, and therefore, at least four throws/pins in each of the antenna switches 110 and 112 (e.g., RF1, RF2, RF3, RF4). For example, the RF1 pin may be associated with a first operating state in which the antenna 104 may transmit and/or receive in the high LTE bands B3, B2, and B1. The RF2 pin may be associated with a second operating state in which the antenna 104 may transmit and/or receive in the LTE bands B12 and B17. The RF3 pin may be associated with a third operating state in which the antenna 104 may transmit and/or receive in the LTE band B13. And the RF4 pin may be associated with a fourth operating state in which the antenna 104 may transmit and/or receive in the LTE band B20. As will be appreciated, the present disclosure is not limited by the examples provided herein and is intended to cover antenna switches that are configured for any number of and/or combination of operating bands or states.

In some embodiments, the number of signal pins included in a given antenna switch may also be determined by the number of control pin(s) included in the switch and/or the type of control signal provided by the control module 106. For example, in some embodiments, the control signal may be a typical logic signal that has either a high value or a low value (e.g., L or H). In such embodiments, the number of control pins determines the maximum number of throws/pins that the switch can have. For example, if a switch has only one control pin (e.g., CTLA), there can be only two possible outcomes (e.g., L or H), and thus up to two throws/operating states (e.g., RF1 and RF2). If a switch has two control pins (e.g., CTLA and CTLB), then there can be up to four possible outcomes (e.g., LL, HL, LH, or HH), and thus up to four throws/operating states (e.g., RF1, RF2, RF3, and RF4). And as shown in Table 1, if a switch has three control pins (e.g., CTLA, CTLB, and CTLC), then the switch could have up to eight possible outcomes, thus eight throws/operating states.

TABLE 1

| CTLA | CTLB | CTLC | PIN |
|---|---|---|---|
| L | L | L | RF1 |
| H | L | L | RF2 |
| L | H | H | RF3 |
| H | H | H | RF4 |
| H | H | L | RF5 |
| H | L | H | RF6 |
| L | L | H | RF7 |
| L | H | L | RF8 |

The antenna switch module 100 may further include a plurality of signal paths 118 that respectively couple the plurality of signal pins RF1, RF2, RF3, and RF4 of the first antenna switch 110 to the plurality of signals pins RF1, RF2, RF3, and RF4 of the second antenna switch 112. As discussed above, each signal pin of each of the antenna switches 110 and 112 may be associated with an operating state. Accordingly, each of the signal paths 118 may be configured for the operating state that corresponds to the pair of signal pins attached thereto. For example, each signal path 118 may include RLC circuitry 120 that is specifically tuned to the frequencies associated with the operating state. The RLC circuitry 120 may include one or more matching network(s), resistors, inductors, capacitors, and/or other electronic components for impedance matching of the signals being delivered by the signal paths 118. Since each of the signal paths 118 may include RLC circuitry 120 that is tuned to the specific frequencies of the signal being carried by that signal path 118, the antenna switch module 100 may be able to provide more precise impedance matching for each of the operating states supported by the antenna 104, thereby improving the antenna performance across all operating states.

As shown in FIG. 1, the antenna switch module 100 may further include one or more control signal paths 122 for coupling the antenna switch module 100 to the control module 106 and one or more input/output signal paths 124 for coupling the antenna switch module 100 to the antenna 104 and the wireless communication circuitry 108. In one embodiment, one control signal path 122 may be coupled between the control pins CTLA in each of the antenna switches 110 and 112 and a second control signal path 122 may be coupled between the control pins CTLB in each of the antenna switches 110 and 112. The control signal paths 122 may also be connected to the control module 106. In one embodiment, one of the input/output signal paths 124 may be coupled between the ANT pin of the antenna switch 110 and the antenna 104, and one of the input/output signal paths 124 may be coupled between the ANT pin of the antenna switch 112 and the wireless communication circuitry 108.

In the exemplary embodiment, the antenna switches 110 and 112 are positioned within the antenna switch module 100 such that the different signal paths 118, 122, and 124 do not cross or overlap. According to one aspect, this may be accomplished by changing an orientation of the antenna switch 110 relative to an orientation of the antenna switch 112. For example, in FIG. 1, the antenna switch 110 has been rotated relative to the antenna switch 112 such that each of an outer edge 126 of the antenna switch 110 and an outer edge 128 of the antenna switch 112 includes the ANT pin of the switch, and each of an upper edge 130 of the antenna switch 110 and an upper edge 132 of the antenna switch 112 includes the respective CTLA and CTLB pins of the switch. As such, the control signal paths 122 can be coupled to the control module 106 without crossing any of the other signals paths 118 and 124, and the input/output signal paths 124 can be coupled to the antenna 104 or the wireless communication circuitry 108 without crossing any of the other signal paths 118 and 122. Likewise, the antenna switches 110 and 112 are positioned such that each of a lower edge 134 of the antenna switch 110 and a lower edge 136 of the antenna switch 112 includes the signal pins RF1 and RF2 of the switch, and each of an inner edge 138 of the antenna switch 110 and an inner edge 140 of the antenna switch 112 includes the signal pins RF3 and RF4 of the switch. As such, each of the signal paths 118 are coupled between signal pins that are positioned in mirrored locations on the antenna switches 110 and 112, thereby avoiding overlap.

As can be appreciated from FIG. 1, if the antenna switches 110 and 112 were configured as SP8T switches (e.g., by replacing four of the GND pins in each switch 110, 112 with signal pins), at least a few of the signal paths 118, 122, and 124 would ultimately overlap or cross in order to accommodate the eight possible operating bands (see Table 1). One reason for this is the configuration of the pins 114, 116 in each of the switches 110, 112. For example, the location of the control pins CTLA and CTLB on the upper edges 130, 132 of each of the switches 110 and 112 causes some signal paths located on a top half of the antenna switch module 100 between the outer edges 126 and 128 to cross over the control paths 122.

Figure 3:
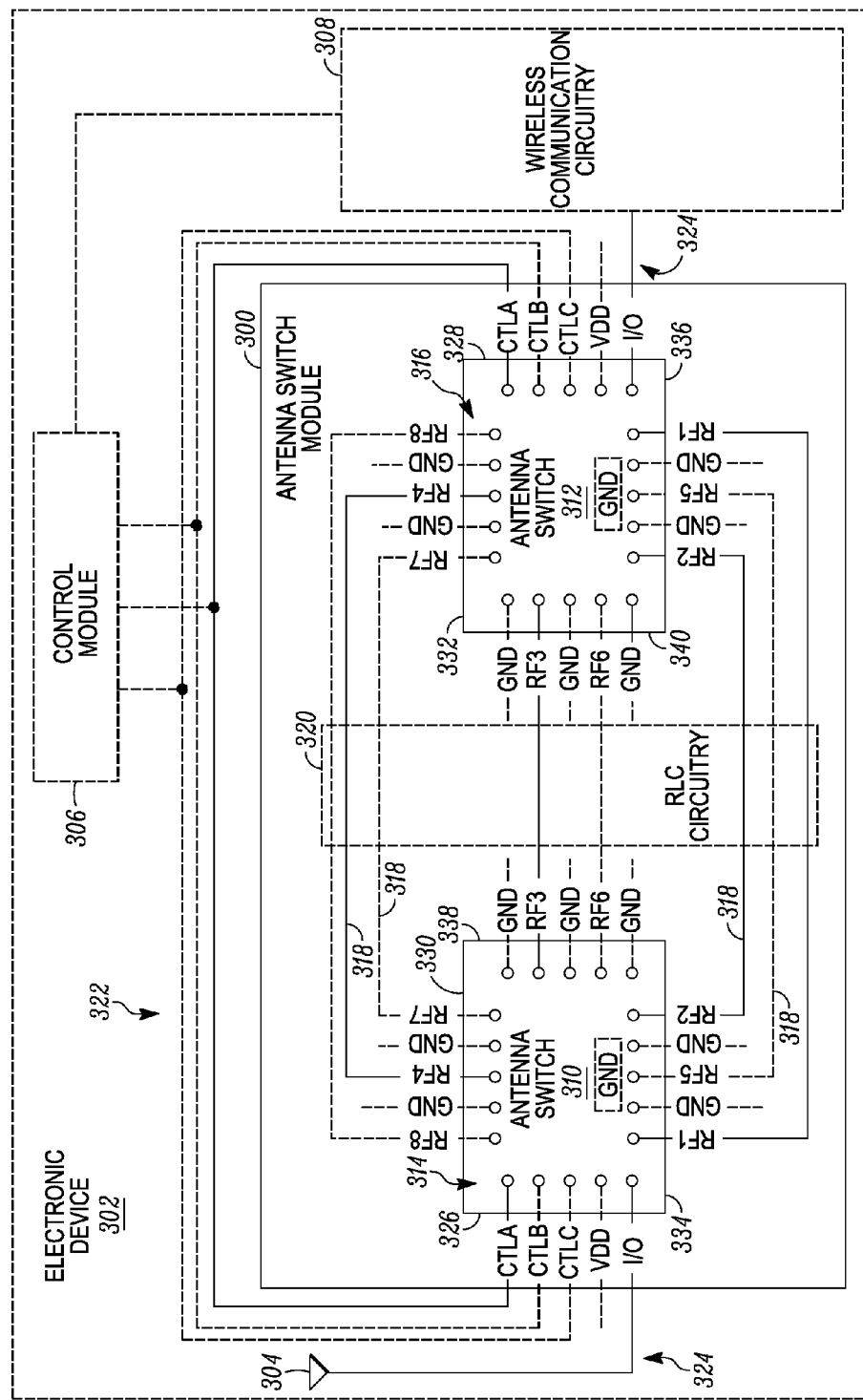
FIG. 3 illustrates an example antenna switch module of in accordance with some embodiments.

FIG. 3 depicts an example antenna switch module 300 consistent with some embodiments. The antenna switch module 300 may be coupled to the antenna 304, which may be similar to the antenna 104 described herein. For example, the antenna 304 may include any suitable type of antenna structure, such as, e.g., an inverted L-antenna, dual inverted L-antenna, inverted-F antenna, or hybrids of these antenna structures. It should be appreciated that the antenna switch module 300 and the electronic device 302, as depicted, are merely an example and can include various combinations of hardware and/or software components. Like the antenna switch module 100 of FIG. 1, the antenna switch module 300 may be included in an electronic device 302 that includes one or more wireless communication components, such as antenna 304. For example, the electronic device 302 may be a mobile computing device, such as, for example, a smartphone or any other type of mobile communications device, a tablet, a gaming console, etc.

According to some aspects, the electronic device 302, like the electronic device 102, may be associated with a "family" of mobile devices, as previously described with reference to FIG. 1. In some embodiments, each variant of a family may include a plurality of antennas (such as three or four antennas similar to antenna 304). Each of the antennas, and any antenna switch modules (such as antenna switch module 300) associated with the antennas, may be tuned to operate within a specified range of frequencies across all variants. In one exemplary embodiment, each variant may include a main antenna structure that is configured to transmit and receive signals over the 850 MHz, 900 MHz, 1800 MHz, and 1900 MHz frequency bands (e.g., in accordance with GSM, UMTS, and/or LTE systems). Each variant may also include a second antenna structure that is configured to receive signals within frequency bands from 700 MHz to 2100 MHz (e.g., in accordance with CDMA and/or LTE systems). In addition, each variant may include a third antenna structure that is configured to receive signals over the 1575 MHz frequency band (e.g., in accordance with the GPS system). In one embodiment, each variant may also include a fourth antenna structure that is configured to transmit and/or receive signals within frequency bands of 2100 MHz or greater (e.g., in accordance with the Bluetooth, WiFi and/or LTE systems).

Referring back to FIG. 3, the electronic device 302 may represent a specific variant, such as one of the variants described above, and the antenna 104 may represent a specific antenna of that variant, such as one of the antennas described above. As such, according to one aspect, the antenna 304 may be configured to transmit and/or receive voice and/or data signals over a predetermined plurality of frequency bands (also referred to herein as "operating bands"). In one embodiment, the antenna 304 may be configured to operate in at least one of the frequency bands at a time, thus allowing the antenna 304 to be small in size, but broad in function. For example, the antenna 304 may be the second or third antenna of the electronic device 302 (e.g., not the main antenna described above).

In one exemplary embodiment, the plurality of frequency bands supported by the antenna 304 may include LTE high bands B1 (e.g., 2100 MHz), B2 (e.g., 1900 MHz), and B3 (e.g., 1800 MHz) and/or carrier-specific LTE bands B12 (e.g., 700 MHz, for US Cellular networks), B13 (e.g., 700 MHz, for Verizon networks), B17 (e.g., 700 MHz, for AT&T networks), and/or B20 (e.g., 800 MHz, for Verizon Networks). In such an embodiment, the antenna 304 may be selectively configured to operate in any one or combination of these frequency bands depending on, for example, the carrier to which the user has subscribed, the spectrum availability of the region in which the user is currently located, and/or the signal strength in each of the operating bands. In other embodiments, the antenna 304 may be configured to support voice and data cellular telephone communications over one or more other cellular network communications or RATs, such as, e.g., GSM, UMTS, CDMA, etc., and/or various types of non-cellular network communications (e.g., GPS, NFC, Bluetooth, WiFi, etc.).

As shown in FIG. 3, the electronic device 302 may further include a control module 306 (similar to control module 106) that is coupled to the antenna switch module 300. The control module 306 may be any type of integrated circuit capable of generating and/or providing one or more control signal(s) to the antenna switch module 300. The control signal may control the frequency band operation of the module 300. For example, in one embodiment, the control signal includes an instruction to the antenna switch module 300 to operate in a specific frequency band. According to some embodiments, the control module 306 may include, or be included within, a processer (such as, e.g., a digital signal processor, a microcontroller, a microprocessor, etc.), a modem, a modulator, a demodulator, and/or a power management unit. The one or more control signal(s) provided by the control module 306 to the antenna switch module 300 may be a control logic signal (e.g., "0", "1", low, high, etc.), an MIPI (Mobile Industry Processor Interface) control signal (e.g., including a clock signal and a data signal), or any other type of control signal.

Also as shown in FIG. 3, the electronic device 302 may further include wireless communication circuitry 308 that is coupled to the antenna switch module 300. The wireless communication circuitry 308 may include, for example, a plurality of amplifiers, power inverters, filters, switches, matching networks (e.g., including one or more resisters, inductors, and/or capacitors), and other components typically found in the radio frequency (RF) front-end architecture of a mobile communications device. In some embodiments, the wireless communication circuitry 308, the control module 306, and/or a processor of the electronic device 302 may determine which frequency band of operation to use for transmitting and/or receiving signals based on, for example, information received by the antenna 304 from one or more wireless communication system(s) (e.g., RAT(s)) related to spectral availability, region-specific information, signal strength, etc. In one embodiment, the wireless communication circuitry 308 may make this determination and provide the frequency information to the control module 306, and the control module 306 may formulate the control signal based thereon.

Still referring to FIG. 3, the antenna switch module 300 may include a plurality of antenna switches, such as a first antenna switch 310 and a second antenna switch 312. The antenna switches 310 and 312 may include any type of switch technology that can be used for mobile communications, including for example, field-effect transistor (FET) switches, such as Gallium Arsenide (GaAs) and CMOS; mechanical switches, such as subminiature relays and micro-electromechanical (MEMS); and PIN diodes. According to one aspect, the presence of two antenna switches 310 and 312 in the antenna switch module 300 may provide improved isolation for each band of antenna operation, thereby improving antenna performance.

According to one aspect, the antenna switches 310 and 312 may be configured to pass signals between the antenna 304 and the wireless communication circuitry 308. In one embodiment, the antenna switches 310 and 312 may be positioned in series with each other, or along the same general signal path (e.g., not in parallel). For example, a signal received by one of the antenna switches 310 or 312 may successively flow through to the other antenna switch 312 or 310. As such, a signal received by the antenna 304 may be passed from the antenna switch 310 to the antenna switch 312 and ultimately, to the wireless communication circuitry 308, and a signal received from the wireless communication circuitry 308 may be passed to the antenna switch 312, then to the antenna switch 310, and ultimately, to the antenna 304 for wireless transmission of the signal.

Each of the antenna switches 310 and 312 may include a plurality of pins (also referred to as pinouts, ports, or terminals), such as a first plurality of pins 314 and a second plurality of pins 316. The exact numbers and types of pins included in each of the antenna switches 310 and 312 may depend on a variety of factors, as described above with respect to FIGS. 1 and 2. In the illustrated embodiment of FIG. 3, each of the plurality of pins 314 and 316 may include at least one control pin (e.g., CTLA, CTLB, CTLC) configured to receive the control signal(s) from the control module 306, at least one ground pin (e.g., GND) configured to ground the switch, at least one voltage pin (e.g., VDD) configured to receive power from a power module, at least one input/output pin (I/O) configured to pass signals to or from the antenna switch, and/or a plurality of signal pins (e.g., RF1, RF2, RF3, RF4, RF5, RF6, RF7, RF8) configured to be selectively coupled to the input/output pin in response to the control signal. As discussed above with respect to FIG. 2, according to one aspect, in response to control signal(s) received at the control pin(s) of a given antenna switch, the input/output pin of the antenna switch may be coupled to a specific signal pin within the switch, the signal pin being selected based on the frequency band specified by the control signal.

According to some aspects, the number of signal pins included in a given antenna switch may be determined by the number of control pin(s) included in the switch and/or the type of control signal provided by the control module 106, as explained above with respect to Table 1. According to one aspect, the exact number of throws, and signal pins coupled thereto, in a given antenna switch may also be related to the number of different operating bands supported by the antenna 304. In some embodiments, each signal pin in each of the switches 310 and 312 may be associated with one or more operating bands and may be configured to pass or deliver only those signals that are within the associated operating band(s). For example, each of the signal pins may be configured for optimal performance with respect to the associated operating band(s) by being coupled to matching networks and/or other electronic components within the antenna switch 310, 312 that are specifically tuned to or optimized for the frequencies of the operating band(s).

According to some aspects, each of the antenna switches 310 and 312 may be an SPxT switch, where the value of "x" depends on (e.g., at least equals) a number of possible operating states supported by the antenna 304. As with the antenna 104, each operating state relates to a group of frequencies or bands in which the antenna 304 may operate at one time. In one embodiment, the antenna 304 supports up to eight different operating states and each of the antenna switches 310 and 312 may be SP8T switches. As will be appreciated, the antenna switches 310 and 312 may be identical in terms of a number of poles and throws in order to have sufficient signal paths between the two switches for each of the operating states supported by the antenna 304.

In one exemplary embodiment, the antenna switches 310 and 312 may be SP4T switches and the antenna 304 may support up to four different operating states. In such an embodiment, the RF1 pin in each of the switches 310 and 312 may be associated with a first operating state in which the antenna 304 may transmit and/or receive in the high LTE bands B3, B2, and B1. The RF2 pin in each of the switches 310 and 312 may be associated with a second operating state in which the antenna 304 may transmit and/or receive in the LTE bands B12 and B17. The RF3 pin in each of the switches 310 and 312 may be associated with a third operating state in which the antenna 304 may transmit and/or receive in the LTE band B13. Lastly, the RF4 pin in each of the switches 310 and 312 may be associated with a fourth operating state in which the antenna 304 may transmit and/or receive in the LTE band B20. As will be appreciated, the present disclosure is not limited by the examples provided herein and is intended to cover antenna switches that are configured for any number of and/or combination of operating bands or states.

The antenna switch module 300 may further include a plurality of signal paths 318 that respectively couple the plurality of signal pins RF1, RF2, RF3, RF4, RF5, RF6, RF7, and/or RF8 of the first antenna switch 310 to the plurality of signals pins RF1, RF2, RF3, RF4, RF5, RF6, RF7, and/or RF8 of the second antenna switch 312. As discussed above, each signal pin of each of the antenna switches 310 and 312 may be associated with an operating state. Accordingly, each of the signal paths 318 may be configured for the operating state that corresponds to the pair of signal pins attached thereto. For example, each signal path 318 may include RLC circuitry 320 that is specifically tuned to the frequencies associated with the operating state. The RLC circuitry 320 may include one or more matching network(s), resistors, inductors, capacitors, and/or other electronic components for impedance matching of the signals being delivered by the signal paths 318. Since each of the signal paths 318 may include RLC circuitry 320 that is tuned to the specific frequencies of the signal being carried by that signal path 318, the antenna switch module 300 may be able to provide more precise impedance matching for each of the operating states supported by the antenna 304, thereby improving the antenna performance across all operating states.

As shown in FIG. 3, the antenna switch module 300 may further include one or more control signal paths 322 for coupling the control pins to the control module 306 and one or more input/output signal paths 324 for coupling the I/O pins to one of the antenna 304 or the wireless communication circuitry 308. Like the antenna switch module 100, the antenna switches 310 and 312 are positioned within the antenna switch module 300 such that the different signal paths 318, 322, and 324 do not cross or overlap. However, the antenna switches 310 and 312 are configured such that the antenna switch module 300 may include up to eight signal paths 318 and up to three control paths 322 without overlapping. To accomplish this, according to some embodiments, the first antenna switch 310 may include the plurality of pins 314 arranged in a first configuration, and the second antenna switch 312 may include the plurality of pins 316 arranged in a second configuration. In one embodiment, the second configuration is a mirror image of the first configuration. As used herein, the term "mirror image" includes a reflection of an original image about an imaginary center line, such that, for example, a left side of the original image appears on a right side of the mirror image and a right side of the original image appears on a left side of the mirror image (e.g., as one wing of a butterfly is a reflection of the other wing).

FIG. 3 illustrates one example of the first configuration of pins in switch 310 and the second configuration of pins in switch 312. In the first configuration, at least one voltage pin (e.g., VDD), at least one input/output (e.g., I/O), and/or at least one control pin (e.g., CTLA, CTLB, and/or CTLC) are arranged on an outer edge (or side) 326 of the antenna switch 310. Similarly, in the second configuration, at least one voltage pin (e.g., VDD), at least one input/output (e.g., I/O), and/or at least one control pin (e.g., CTLA, CTLB, and/or CTLC) are arranged on an outer edge 328 of the antenna switch 312. As can be seen in FIG. 3, the outer edge 326 and the outer edge 328 are located adjacent to opposing sides of the antenna switch module 300. In other words, the outer edge 326 is on a side of the antenna switch 310 that is opposite from the side of the antenna switch 312 on which the outer edge 328 is included and is on another side of the antenna switch module 300 than the outer edge 328. As such, the outer edge 326 in the first configuration may be a mirror opposite of the outer edge 328 in the second configuration. According to one embodiment, the first configuration may be arranged such that the input/output pin of the first antenna switch 310 is coupled to the antenna 304, and the second configuration may be arranged such that the input/output pin of the second antenna switch 312 is coupled to the wireless communication circuitry 308.

Further, the first configuration may be arranged such that the plurality of signal pins 314 are located on one or more remaining sides of the antenna switch 310. Likewise, the second configuration may arranged such that the plurality of signal pins 316 are located one or more remaining sides of the antenna switch 312. More specifically, in the first configuration, an upper edge 330 of the antenna switch 310 includes at least one ground pin (e.g., GND) and at least one signal pin (e.g., RF4, RF7, and/or RF8), and in the second configuration, an upper edge 332 of the antenna switch 312 includes at least one ground pin (e.g., GND) and at least one signal pin (e.g., RF4, RF7, and/or RF8). According to one aspect, the upper edge 330 in the first configuration may be a mirror image of the upper edge 332 in the second configuration. In addition, the first configuration may be arranged such that a lower edge 334 includes at least one ground pin (e.g., GND) and at least one signal pin (e.g., RF1, RF2, and/or RF5), and the second configuration may be arranged such that a lower edge 336 includes at least one ground pin (e.g., GND) and at least one signal pin (e.g., RF1, RF2, and/or RF5). According to one aspect, the lower edge 334 in the first configuration may be a mirror image of the lower edge 336 in the second configuration. Moreover, the first configuration may be arranged such that an inner edge 338 includes at least one ground pin (e.g., GND) and at least one signal pin (e.g., RF3 and/or RF6), and the second configuration may be arranged such that an inner edge 340 includes at least one ground pin (e.g., GND) and at least one signal pin (e.g., RF3 and/or RF6). According to one aspect, the inner edge 338 in the first configuration may be a mirror image of the inner edge 340 in the second configuration.

In one embodiment, the antenna switches 310 and 312 may be arranged adjacent to each other within the antenna switch module 300 so that the inner edge 338 aligns with the inner edge 340, thereby causing the other edges of the switches to correspondingly align as well. According to one aspect, due to the first configuration of pins 314 and the second configuration of pins 316, the control signal paths 322 can be coupled to the control module 306 without crossing any of the other signals paths 318 and 324, and the input/output signal paths 324 can be coupled to the antenna 304 or the wireless communication circuitry 308 without crossing any of the other signal paths 318 and 322. Likewise, each of the signal paths 318 can be coupled between signal pins that are positioned in mirrored locations on the antenna switches 310 and 312, without overlapping.

Figure 4:
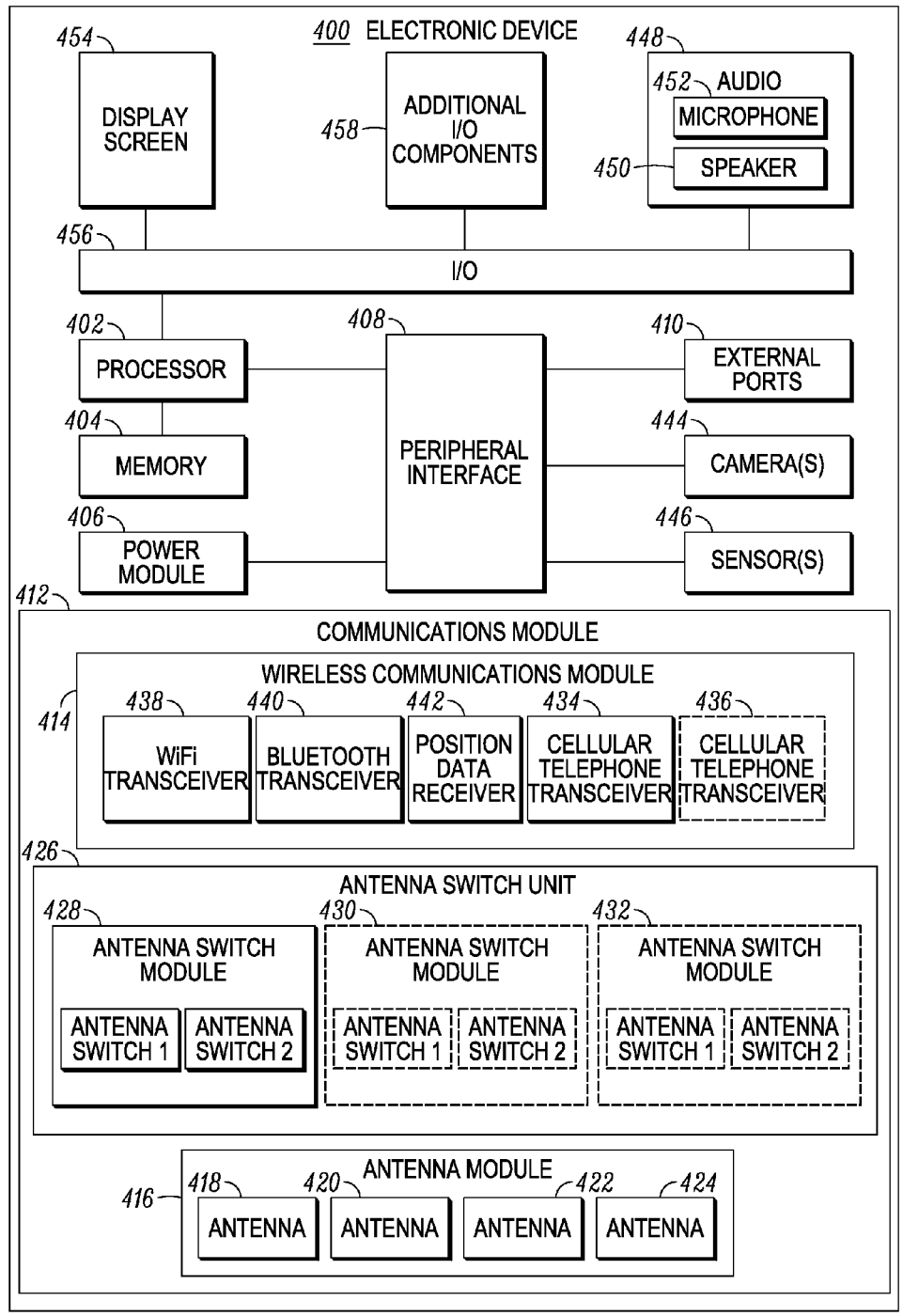
FIG. 4 is a block diagram of an example electronic device including an antenna switch module in accordance with some embodiments.

Referring now to FIG. 4, shown is an example electronic device 400 in which some embodiments may be implemented. The electronic device 400 can include a processor 402, a memory 404 (e.g., hard drives, flash memory, MicroSD cards, and others), a power module 406 (e.g., batteries, fuel cells, wired or wireless charging circuits, etc.), a peripheral interface 408, and one or more external ports 410 (e.g., Universal Serial Bus (USB), HDMI, Firewire, and/or others). The memory 404 can have a distributed architecture where various components are situated remote from one another, but are still accessed by the processor 402. These other components may reside on devices located elsewhere on a network or in a cloud arrangement.

The electronic device 400 can further include a communication module 412 coupled to the peripheral interface 408. The communication module 412 may include wireless communication circuitry 414 (e.g., similar to wireless communication circuitry 108 and/or 208) and an antenna module 416. According to some embodiments, the antenna module 416 may include one or more of antennas 418, 420, 422, or 424 (e.g., similar to antenna 104 and/or 204). The communication module 412 may further include an antenna switch unit 426. According to some embodiments, the antenna switch unit 426 may include one or more of antenna switch modules 428, 430, or 432 (e.g., similar to antenna switch module 100 and/or 200).

According to one aspect, the number of antenna switch modules may be related to the number of antennas. For example, according to one embodiment, the antenna 418 may be a main antenna that does not require an antenna switch module, but the antennas 420 and 422 may be smaller multi-band antennas that each requires antenna switching in order to selectively operate in a plurality of frequency bands. In such an example, the antenna 420 may be coupled to the antenna switch module 428 and the antenna 422 may be coupled to the antenna switch module 430. In another example, the antenna 422 may be a smaller antenna that operates on only one frequency band, or a plurality of frequency bands that are very close together and therefore, does not need antenna switching. In such a case, the electronic device 400 may include only one antenna switch module 428 coupled to the multi-band antenna 420.

The wireless communication circuitry 414 can include one or more transceivers functioning in accordance with IEEE standards, 3GPP standards, or other standards, and configured to receive and transmit data via the one or more external ports 410. The wireless communication circuitry 414 may include one or more WWAN transceivers (such as, e.g., cellular telephone transceivers 434 and 436) configured to communicate with a wide area network, including one or more cell sites or base stations to communicatively connect the electronic device 400 to additional devices or components. Further, the wireless communication circuitry 414 can include one or more WLAN and/or WPAN transceivers, such as WiFi transceiver 438 and Bluetooth transceiver 440, that are configured to connect the electronic device 400 to local area networks and/or personal area networks, such as a WiFi network and/or a Bluetooth network. In addition, the wireless communication circuitry 414 can include one or more position data receiver 442 that are configured to obtain position-related data, or GPS coordinates, from a position data network, such the GPS system. Still further, the wireless communication circuitry 414 can include one or more point-to-point transceivers (not shown) configured to connect the electronic device 400 short-range communication networks, such as, e.g., near-field-communication (NFC) and/or radio frequency identification (RFID).

The electronic device 400 can further include a camera 444 for capturing images and/or video; one or more sensors 446, such as, for example, accelerometers, gyroscopic sensors (e.g., three angular-axis sensors), additional proximity sensors, tilt sensors, and/or other sensors; and an audio module 448 including hardware components such as a speaker 450 for outputting audio and a microphone 452 for receiving audio. In some embodiments, the speaker 450 and the microphone 452 can be piezoelectric components. The electronic device 400 can further include a display screen 454, an input/output (I/O) controller 456, and additional I/O components 458 (e.g., capacitors, keys, buttons, lights, LEDs, cursor control components, haptic components, touch-sensitive components, and others). The display screen 454, the audio module 448, and the additional I/O components 458 may be considered to form portions of a user interface (e.g., portions of the electronic device 400 associated with presenting information to the user and/or receiving inputs from the user). In some embodiments, the display screen 454 is a touchscreen display using singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, and/or others.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 402 (e.g., working in connection with an operating system) to implement a method for arranging antennas as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 5:
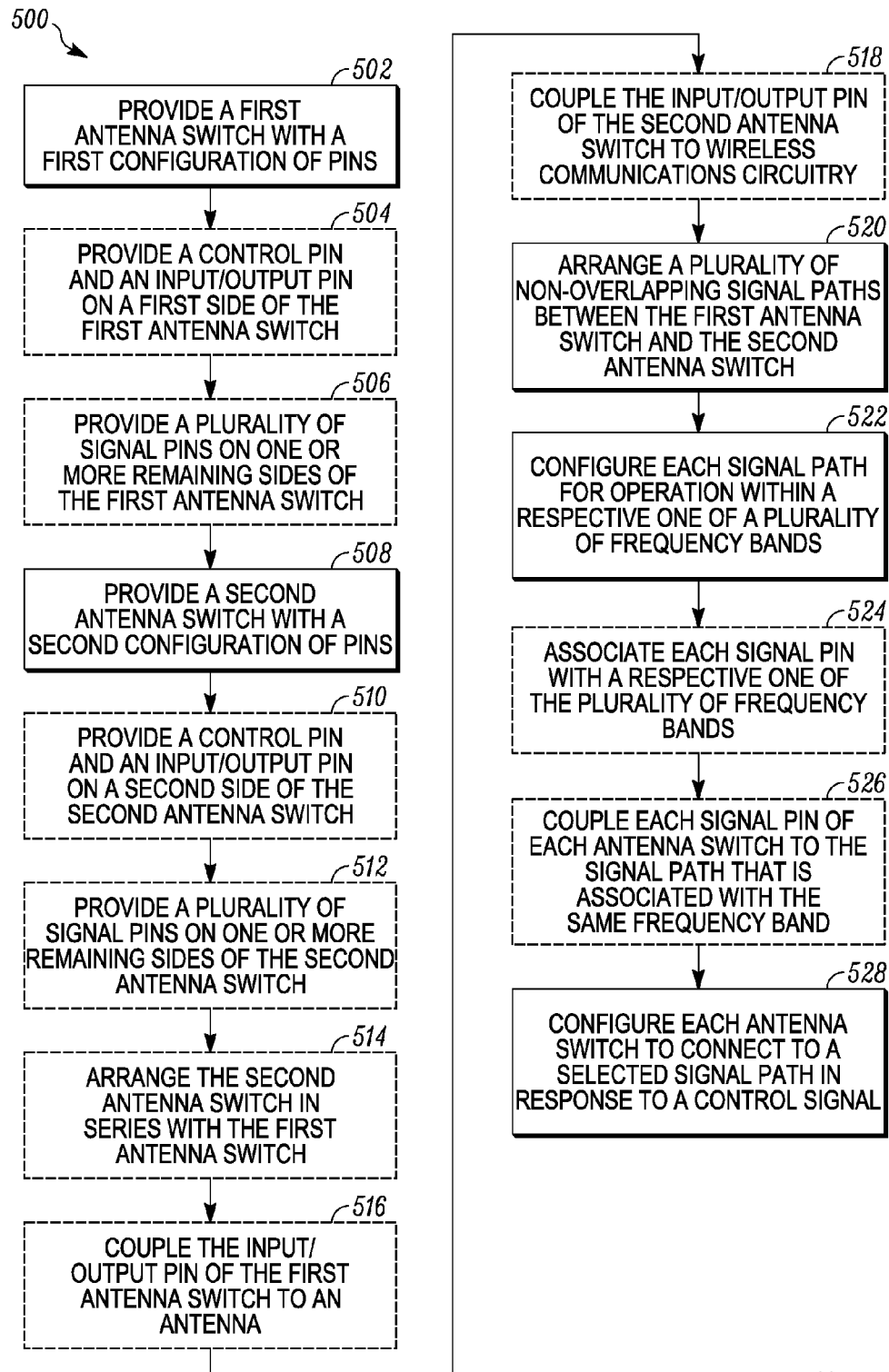
FIG. 5 is a flow diagram depicting control of providing an antenna switch module in an electronic device in accordance with some embodiments.

FIG. 5 is a flowchart of a method 500 for controlling functions associated with providing an antenna switch module (e.g., antenna switch module 300) in an electronic device (e.g., electronic device 302) having wireless communication circuitry (e.g., wireless communication circuitry 308) and at least one antenna (e.g., antenna 304) configured for operation in a plurality of frequency bands. According to one aspect, the antenna switch module may be manufactured, designed, and/or assembled using the steps of the method 500. It is understood that the order of the steps of the depicted flowchart of FIG. 5 can be in any order, and certain ones can be eliminated, and/or certain other ones can be added depending upon the implementation.

The method 500 may begin at step 502, which includes providing a first antenna switch (e.g., antenna switch 310) having a plurality of pins (e.g., pins 314) arranged in a first configuration around the first antenna switch. In some embodiments, the method 500 continues to step 504, which includes providing at least one control pin (e.g., CTLA, CTLB, and/or CTLC) and an input/output pin (e.g., I/O) on a first side (e.g., outer edge 326) of the first antenna switch in accordance with the first configuration. In one embodiment, the method 500 continues to step 506, which includes providing a plurality of signal pins (e.g., RF1, RF2, RF3, etc.) on one or more remaining sides (e.g., upper edge 330, inner edge 338, and/or lower edge 334) of the first antenna switch in accordance with the first configuration.

The method 500 further includes step 508, which includes providing a second antenna switch (e.g., antenna switch 312) having a plurality of pins (e.g., pin 316) arranged in a second configuration around the second antenna switch, wherein the second configuration is a mirror image of the first configuration. In some embodiments, the method 500 continues to step 510, which includes providing at least one control pin and an input/output pin on a second side (e.g., outer edge 328) of the second antenna switch in accordance with the second configuration. In one embodiment, the method 500 continues to step 512, which includes providing a plurality of signal pins (e.g., RF1, RF2, RF3, etc.) on one or more remaining sides (e.g., upper edge 332, inner edge 340, and/or lower edge 336) of the second antenna switch in accordance with the second configuration.

In some embodiments, the method 500 includes, at step 514, arranging the first antenna switch in series with the second antenna switch, such that the first side of the first antenna switch and the second side of the second antenna switch are on opposite ends of the antenna switch module. For example, the antenna switches may be positioned in series with each other by placing the switches along the same general signal path (e.g., not in parallel). In one embodiment, the method continues to step 516, which includes coupling the first antenna switch to the at least one antenna of the electronic device. For example, step 516 may include coupling the input/output pin of the first antenna switch to the at least one antenna. In one embodiment, the method continues to step 518, which includes coupling the second antenna switch to the wireless communication circuitry of the electronic device. For example, step 518 may include coupling the input/output pin of the second antenna switch to the wireless communication circuitry.

The method 500 further includes step 520, which includes arranging a plurality of signal paths between the first antenna switch and the second antenna switch without any intersecting signal paths. From step 520, the method 500 continues to step 522, which includes configuring each signal path for operation within a respective one of the plurality of frequency bands. In some embodiments, the method 500 continues to step 524, which includes associating each signal pin of each antenna switch with a respective one of the plurality of frequency bands. In one embodiment, the method 500 continues to step 526, which includes coupling each signal pin of each antenna switch to the signal path that is configured for operation in the frequency band associated with the signal pin.

The method 500 further includes step 528, which includes configuring each of the first antenna switch and the second antenna switch to operatively connect to a selected one of the plurality of signal paths in response to a control signal. According to one aspect, the control signal includes an instruction to the antenna switch module to operate in a specific frequency band. In some embodiments, the step 528 may be implemented by configuring each antenna switch, in response to the control signal, to selectively couple the input/output pin to the signal pin that is associated with the specified frequency band. In this manner, a signal may be passed between the input/output pin and the selected signal pin of each antenna switch, thereby completing a signal path between the antenna and the wireless communication circuitry for transmission and/or reception purposes.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. An antenna switch module for an electronic device including wireless communication circuitry and an antenna configured to transmit and receive signals over a plurality of frequency bands, the antenna switch module comprising:
   a plurality of antenna switches positioned in series and configured to pass signals between the antenna and the wireless communication circuitry and to selectively operate in on of the plurality of frequency bands in response to a control signal, each antenna switch having a plurality of pins, and the plurality of antenna switches including:
   a first antenna switch with the plurality of pins arranged in a first configuration, the first configuration having a first plurality of signal pins, a first control pin, and a first input/output pin, the first control pin and the first input/output pin arranged on a first side of the first antenna switch,
   a second antenna switch with the plurality of pins arranged in a second configuration, the second configuration being a mirror image of the first configuration, the second configuration having a second plurality of signal pins, a second control pin, and a second input/output pin, the second control pin and the second input/output pin arranged on a second side of the second antenna switch, the second antenna switch and the first antenna switch located adjacent to opposing sides of the antenna switch module; and
   a plurality of non-overlapping signal paths configured to selectively deliver signals between the first antenna switch and the second antenna switch, each signal path being associated with a respective one of the plurality of frequency bands, each of the plurality of non-overlapping signal paths comprising a matching network configured to impedance match the first antenna switch with the second antenna switch, and each of the first and second signal pins of the first and second plurality of signal pins of each antenna switch associated with a respective one of the plurality of frequency bands and coupled to the signal path associated with the same frequency band.

2. The antenna switch module of claim 1, wherein the first control pin is configured to receive the control signal, the first input/output pin is configured to pass signals to or from the first antenna switch, and the first plurality of signal pins are configured to be selectively coupled to the first input/output pin in response to the control signal.

3. The antenna switch module of claim 2, wherein in the first configuration, the first plurality of signal pins of the first antenna switch are arranged on one or more remaining sides of the first antenna switch, and in the second configuration, the second plurality of signal pins of the second antenna switch are arranged on one or more remaining sides of the second antenna switch.

4. The antenna switch module of claim 2, wherein the control signal includes an instruction to operate in a specific frequency band, and in response to the control signal, the first and second input/output pins of the first and second antenna switches, respectively, are coupled to the first or second signal pin that is associated with the specified frequency band.

5. The antenna switch module of claim 2, further including:
   circuitry coupled to each signal path, the circuitry being configured for operation in the frequency band associated with the signal path.

6. An electronic device, comprising:
   at least one antenna configured to transmit and/or receive signals within a plurality of frequency bands;
   wireless communication circuitry configured to operate in the plurality of frequency bands; and
   an antenna switch module configured to pass signals between the antenna and the wireless communication circuitry, the antenna switch module including:
   a plurality of antenna switches configured to selectively operate in one of the plurality of frequency bands in response to a control signal, the plurality of antenna switches including:
   a first antenna switch with a first plurality of pins arranged in a first configuration, the first plurality of pins including a first plurality of signal pins, a first control pin, and a first input/output pin, the first control pin and the first input/output pin arranged on a first side of the first antenna switch,
   a second antenna switch, positioned in series with the first antenna switch, with a second plurality of pins arranged in a second configuration, the second configuration being a mirror image of the first configuration, the second plurality of pins including a second plurality of signal pins, a second control pin, and a second input/output pin, the second control pin and the second input/output pin arranged on a second side of the second antenna switch, the second antenna switch and the first antenna switch located adjacent to opposing sided of the antenna switch module, and a plurality of non-overlapping signal paths coupled to the first antenna switch and the second antenna switch without crossing, each signal path being associated with a respective one of the plurality of frequency bands, the at least one of the first or second control pin in each of the first or second antenna switch configured to receive the control signal, the first or second input/output pin in each of the first or second antenna switch configured to pass signals to or from the first or second antenna switch, and the first or second of the plurality of signal pins in each of the first or second antenna switch configured to be selectively coupled to the first or second input/output pin in response to the control signal, each of the first or second signal pin of the first or second plurality of signal pins associated with a respective one of the plurality of frequency bands being coupled to the signal path associated with the same frequency band, and each of the plurality of non-overlapping signal paths comprises a matching network configured to impedance match the first antenna switch with the second antenna switch.

7. The electronic device of claim 6, further comprising:
a control module configured to generate the control signal.

8. The electronic device of claim 6, wherein the control signal includes an instruction to operate in a specific frequency band, and in response to the control signal, the first or second input/output pin of each of the first or second antenna switch, respectively, is coupled to the first or second signal pin that is associated with the specified frequency band.

9. The antenna switch module of claim 6, wherein the input/output port of the first antenna switch is coupled to the antenna.

10. The antenna switch module of claim 6, wherein the input/output port of the second antenna switch is coupled to the wireless communication circuitry.

11. A method of providing an antenna switch module in an electronic device having wireless communication circuitry and at least one antenna configured for operation in a plurality of frequency bands, the method comprising:
providing a first antenna switch having a first plurality of pins arranged in a first configuration around the first antenna switch, first configuration having a first plurality of signal pins, a first control pin, and a first input/output pin, the first control pin and the first input/output pin arranged on a first side of the first antenna switch, and each signal pin of the plurality of signal pins associated with a respective one of the plurality of frequency bands and coupled to a signal path configured for operation in a frequency band associated with the first signal pin;
providing a second antenna switch having a second plurality of pins arranged in a second configuration around the second antenna switch, the second configuration being a mirror image of the first configuration and having a second plurality of signals pins, a second control pin, and a second input/output pin, the second control pin and the second input/output pin arranged on a second side of the second antenna switch, the second antenna switch and the first antenna switch located adjacent to opposing sides of the antenna switch module, and each signal pin of the second plurality of signal pins associated with a respective one of the plurality of frequency bands and coupled to a signal path configured for operation in a frequency band associated with the signal pin;
coupling the first antenna switch to the at least one antenna of the electronic device;
coupling the second antenna switch to the wireless communication circuitry of the electronic device;
arranging a plurality of signal paths between the first antenna switch and the second antenna switch without any intersecting signal paths;
configuring each signal path for operation within a respective one of the plurality of frequency bands; and
configuring each of the first antenna switch and the second antenna switch to operatively connect to a selected one of the plurality of signal paths in response to a control signal, each of the plurality of signal paths comprising a matching network configured to impedance match the first antenna switch with the second antenna switch.

12. The method of claim 11,
wherein coupling the first antenna switch to the at least one antenna includes coupling the first input/output pin of the first antenna switch to the at least one antenna, and coupling the second antenna switch to the wireless communication circuitry includes coupling the second input/output pin of the second antenna switch to the wireless communication circuitry.

13. The method of claim 12, further comprising:
in accordance with the first configuration, providing the first plurality of signal pins on one or more remaining sides of the first antenna switch; and
in accordance with the second configuration, providing the second plurality of signal pins on one or more remaining sides of the second antenna switch.

14. The method of claim 12, wherein the control signal includes an instruction to operate in a specific frequency band, and the method further comprises:
configuring each antenna switch to, in response to the control signal, couple the first or second input/output pin to the first or second signal pin that is associated with the specified frequency band.

15. The antenna switch module of claim 1, wherein a number of first signal pins comprising the first plurality of signal pins is determined by a number of the first control pins.

16. The antenna switch module of claim 4, wherein the instruction to operate in a specific frequency band is determined based on information received by the antenna switch module from one or more wireless communication systems.

17. The electronic device of claim 6, wherein a number of first signal pins comprising the first plurality of signal pins is determined by a number of the first control pins.

18. The electronic device of claim 8, wherein the instruction to operate in a specific frequency band is determined based on information received by the at least one antenna from one or more wireless communication systems.

19. The method of claim 11, wherein a number of the first signal pins comprising the first plurality of signal pins is determined by a number of the first control pins.

20. The method of claim 14, wherein the instruction to operate in a specific frequency band is determined based on information received by the at least one antenna from one or more wireless communication systems.

* * * * *

UNITED STATES PATENT AND TRADEMARK OFFICE
CERTIFICATE OF CORRECTION

PATENT NO. : 9,326,320 B2  
APPLICATION NO. : 14/012050  
DATED : April 26, 2016  
INVENTOR(S) : Hong et al.

Page 1 of 1

It is certified that error appears in the above-identified patent and that said Letters Patent is hereby corrected as shown below:

In the Claims

In Column 19, Line 58, before "…of the plurality of frequency," delete "on" and insert --one--, therefor.

In Column 21, Line 7, after "adjacent to opposing," delete "sided" and insert --sides--, therefor.

In Column 21, Line 49, before "…first configuration having," insert --the--, therefor.

In Column 21, Line 61, after "second plurality of," delete "signals" and insert --signal--, therefor.

Signed and Sealed this
Twelfth Day of July, 2016

Michelle K. Lee
*Director of the United States Patent and Trademark Office*